US012602483B2

(12) United States Patent
Paulraj et al.

(10) Patent No.: US 12,602,483 B2
(45) Date of Patent: Apr. 14, 2026

(54) SECURE BOOTING OF CHANNEL CARDS USING A MANAGEMENT CONTROLLER OF A DATA PROCESSING SYSTEM

(71) Applicant: Dell Products L.P., Round Rock, TX (US)

(72) Inventors: Deepaganesh Paulraj, Bangalore (IN); Vinod Parackal Saby, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 160 days.

(21) Appl. No.: 18/785,283

(22) Filed: Jul. 26, 2024

(65) Prior Publication Data

US 2026/0030358 A1     Jan. 29, 2026

(51) Int. Cl.
*G06F 21/57* (2013.01)

(52) U.S. Cl.
CPC .......... *G06F 21/575* (2013.01); *G06F 21/572* (2013.01)

(58) Field of Classification Search
CPC ............................. G06F 21/575; G06F 21/572
USPC .............................................................. 713/2
See application file for complete search history.

(56) References Cited

U.S. PATENT DOCUMENTS

| | | |
|---|---|---|
| 6,976,087 B1 | 12/2005 | Westfall |
| 7,024,593 B1 | 4/2006 | Budd |
| 7,974,286 B2 | 7/2011 | Keohane et al. |
| 10,075,334 B1 | 9/2018 | Kozura |
| 11,252,192 B1 | 2/2022 | Kwan |

| | | |
|---|---|---|
| 2004/0128514 A1 | 7/2004 | Rhoads |
| 2005/0048924 A1 | 3/2005 | Nelson |
| 2005/0078088 A1 | 4/2005 | Davis |
| 2006/0143543 A1 | 6/2006 | Mandrell |
| 2006/0285502 A1 | 12/2006 | Bigioi |
| 2009/0069049 A1 | 3/2009 | Jain |
| 2009/0265720 A1 | 10/2009 | Nagampalli |
| 2012/0257118 A1 | 10/2012 | Aotake |
| 2013/0117766 A1 | 5/2013 | Bax |
| 2013/0283380 A1 | 10/2013 | Thadikaran |
| 2015/0213355 A1 | 7/2015 | Sharma |
| 2016/0142243 A1 | 5/2016 | Karam |

(Continued)

OTHER PUBLICATIONS

Integrated Dell Remote Access Controller 9 User's Guide Published Dec. 2021 (368 pages).

(Continued)

*Primary Examiner* — Paul R. Myers
(74) *Attorney, Agent, or Firm* — WOMBLE BOND DICKINSON (US) LLP

(57) ABSTRACT

Methods and systems for managing operations of a data processing system are disclosed. To manage operations of the data processing system, it may be identified that firmware hosted by a channel card operably connected to the data processing system has failed verification during a secure booting procedure. A management controller of the data processing system may perform a verification procedure to obtain a channel card certificate. At least one entry may be added by the management controller to a secure booting procedure database to facilitate verification of the firmware. After the at least one entry is added, the management controller may resume the secure booting procedure. Using the at least one entry, the secure booting procedure may be completed to place the data processing system in an operable state that is conducive to providing computer-implemented services, which may then be provided.

20 Claims, 7 Drawing Sheets

(56)  References Cited

U.S. PATENT DOCUMENTS

| | | | |
|---|---|---|---|
| 2016/0173578 | A1 | 6/2016 | Sharma |
| 2019/0306018 | A1 | 10/2019 | Steverson |
| 2019/0342079 | A1 | 11/2019 | Rudzitis |
| 2020/0344325 | A1 | 10/2020 | Sarisky |
| 2020/0396128 | A1 | 12/2020 | Tseng |
| 2021/0097186 | A1 | 4/2021 | Mandal |
| 2021/0120104 | A1 | 4/2021 | Al-Mufti |
| 2022/0035685 | A1 | 2/2022 | Ghosh |
| 2022/0091744 | A1 | 3/2022 | Kutner |
| 2022/0100840 | A1 | 3/2022 | Shtalenkov |
| 2022/0121619 | A1 | 4/2022 | Sharma |
| 2022/0151022 | A1 | 5/2022 | Chikkur Dattatraya |
| 2022/0207463 | A1 | 6/2022 | Young |
| 2023/0259632 | A1 | 8/2023 | Marciano |
| 2023/0328037 | A1 | 10/2023 | Sankaranarayanan |
| 2024/0267251 | A1 | 8/2024 | Mishelevich |
| 2025/0148078 | A1 | 5/2025 | Lal |

OTHER PUBLICATIONS

Cycuity, "Detect and Prevent Security Vulnerabilities in your Hardware Root of Trust," 2022. Web Page <https://cycuity.com/wp-content/uploads/2022/06/Cycuity_White-Paper_Detect-Security-Vulnerabilities-HRoT.pdf> accessed on Jul. 23, 2024 (17 Pages).

Elmaghbub, Abdurrahman, et al., "Domain-Agnostic Hardware Fingerprinting-Based Device Identifier for Zero-Trust IoT Security," IEEE Wireless Communications 31.2 (2024) (7 Pages).

Rostami, Mohamadreza, et al. "Beyond random inputs: A novel ml-based hardware fuzzing." 2024 Design, Automation & Test in Europe Conference & Exhibition. IEEE. (2024) (6 Pages).

Gaikwad, Pravin, et al. "Third-party hardware IP assurance against Trojans through supervised learning and post-processing." arXiv preprint arXiv:2111.14956. IEEE. (2021) (13 Pages).

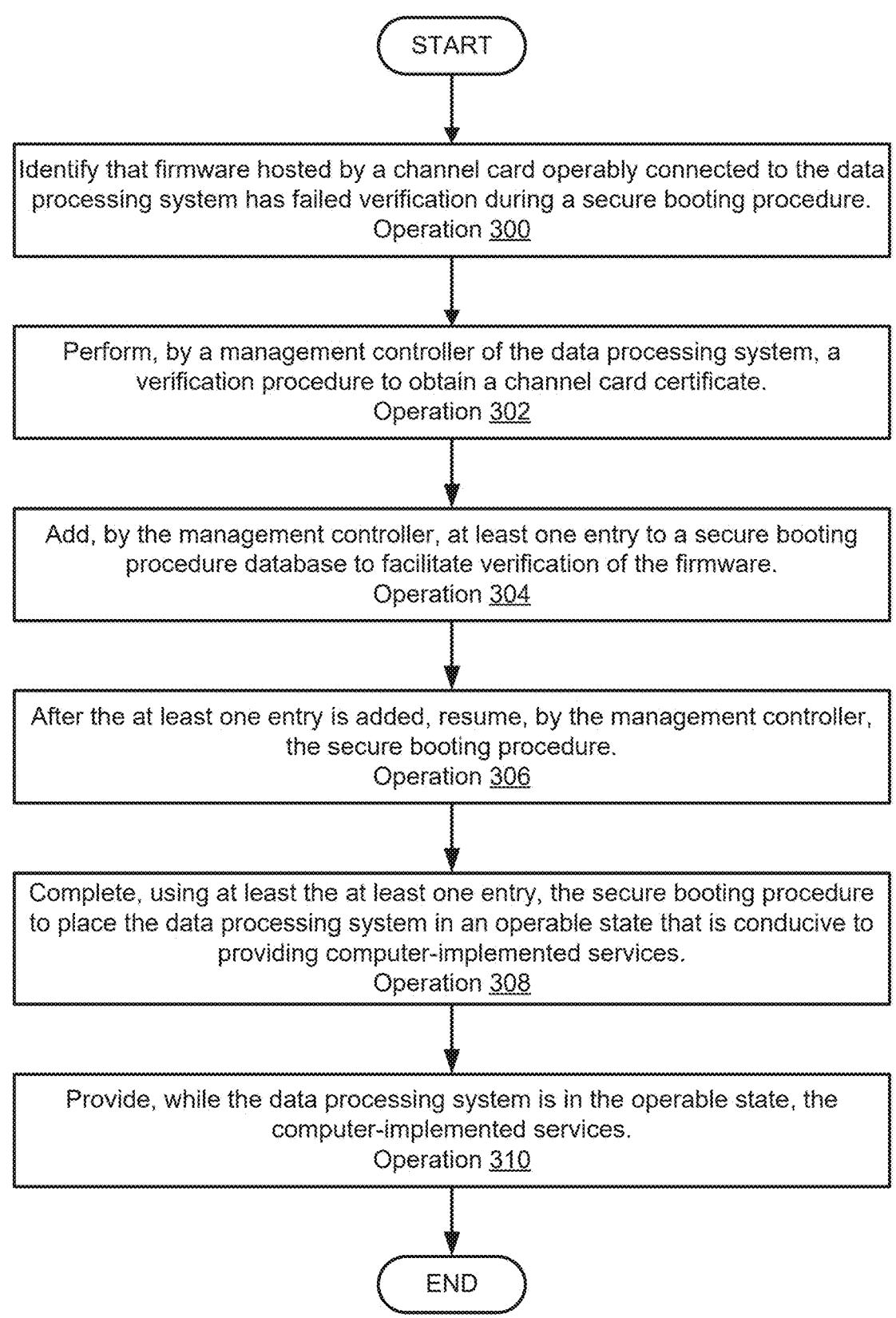

START

Identify that firmware hosted by a channel card operably connected to the data processing system has failed verification during a secure booting procedure.
Operation 300

Perform, by a management controller of the data processing system, a verification procedure to obtain a channel card certificate.
Operation 302

Add, by the management controller, at least one entry to a secure booting procedure database to facilitate verification of the firmware.
Operation 304

After the at least one entry is added, resume, by the management controller, the secure booting procedure.
Operation 306

Complete, using at least the at least one entry, the secure booting procedure to place the data processing system in an operable state that is conducive to providing computer-implemented services.
Operation 308

Provide, while the data processing system is in the operable state, the computer-implemented services.
Operation 310

END

FIG. 3

SECURE BOOTING OF CHANNEL CARDS USING A MANAGEMENT CONTROLLER OF A DATA PROCESSING SYSTEM

FIELD

Embodiments disclosed herein relate generally to managing operation of a data processing system. More particularly, embodiments disclosed herein relate to systems and methods to manage secure booting of channel cards using a management controller of a data processing system.

BACKGROUND

Computing devices may provide computer-implemented services. The computer-implemented services may be used by users of the computing devices and/or devices operably connected to the computing devices. The computer-implemented services may be performed with hardware components such as processors, memory modules, storage devices, and communication devices. The operation of these components may impact the performance of the computer-implemented services.

BRIEF DESCRIPTION OF THE DRAWINGS

Embodiments disclosed herein are illustrated by way of example and not limitation in the figures of the accompanying drawings in which like references indicate similar elements.

FIG. 3 shows a flow diagram illustrating a method of managing a data processing system in accordance with an embodiment.

DETAILED DESCRIPTION

Figure 1A:
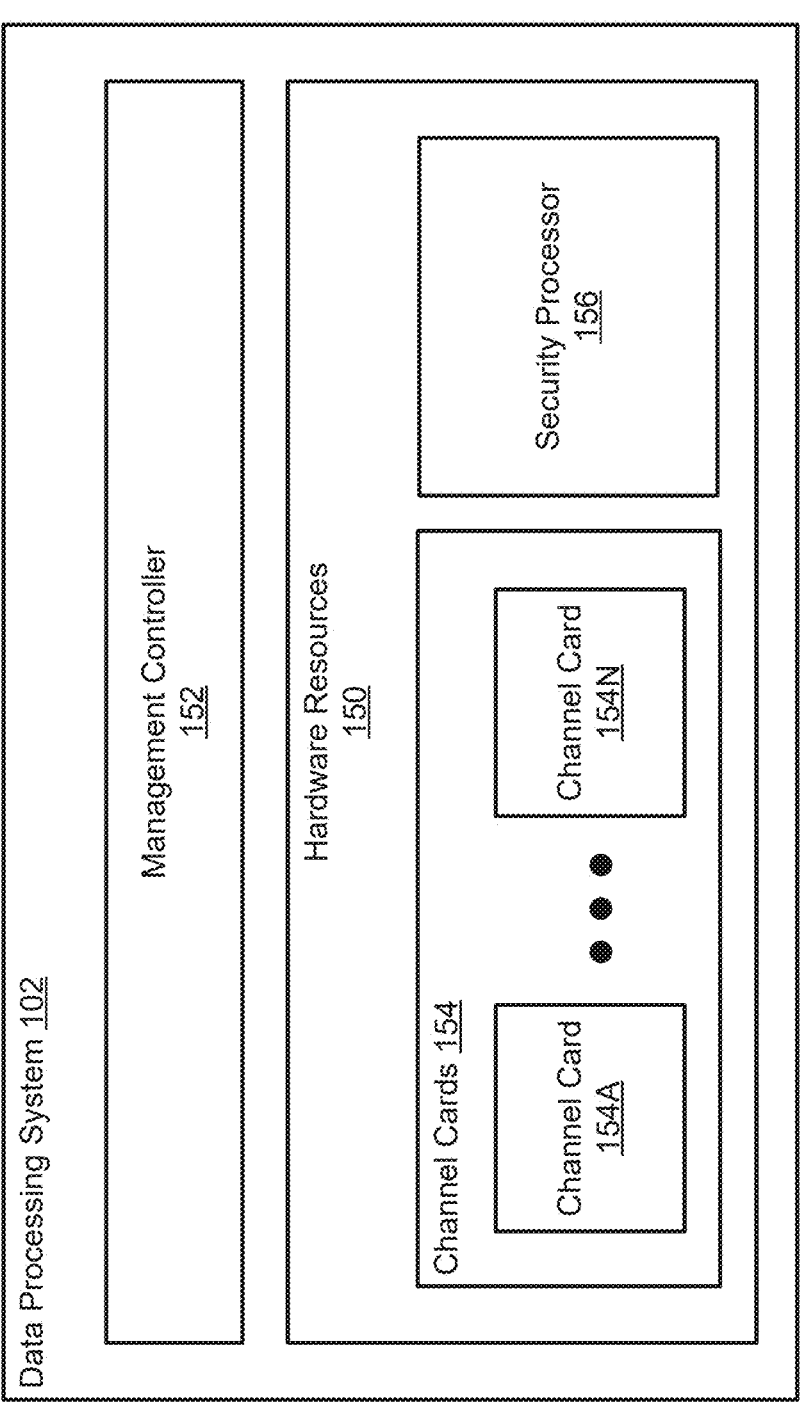
FIG. 1A shows a block diagram illustrating a system in accordance with an embodiment.

Various embodiments will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments disclosed herein.

Reference in the specification to "one embodiment" or "an embodiment" means that a particular feature, structure, or characteristic described in conjunction with the embodiment can be included in at least one embodiment. The appearances of the phrases "in one embodiment" and "an embodiment" in various places in the specification do not necessarily all refer to the same embodiment.

References to an "operable connection" or "operably connected" means that a particular device is able to communicate with one or more other devices. The devices themselves may be directly connected to one another or may be indirectly connected to one another through any number of intermediary devices, such as in a network topology.

In general, embodiments disclosed herein relate to methods and systems for managing operation of a data processing system. The data processing system may provide computer-implemented services. To provide the computer-implemented services, hardware resources of the data processing system such as memory, processors, channel cards, etc. may perform desired functions using hosted software and/or firmware components.

To perform the desired functions, a secure booting procedure of the hardware components may be performed to place the data processing system in an operable state (e.g., during a startup of the data processing system). During the secure booting procedure, a security processor of the data processing system may use secure booting software (e.g., a basic input/output system (BIOS), unified extensible firmware interface (UEFI)) to verify that firmware hosted by hardware components is safe to boot by performing a hash matching process. For example, to boot a channel card, the security processor may obtain a copy of the firmware code used by the channel card, and may use the copy of the firmware code as input to a hash function. A hash of the firmware may be obtained as output.

The hash may then be compared to signed hashes in a secure booting procedure database. The signed hashes may correspond to firmware which is known to be trustworthy to the data processing system (e.g., not malicious). If a signed hash is identified in the secure booting procedure database which matches the hash, the firmware may be verified and allowed to boot.

Over time (e.g., after manufacturing or setup), hardware resources such as channel cards may be modified (e.g., by an end user). For example, a stock channel card may be replaced with a channel card with non-standard functions (e.g., an aftermarket channel card, a non-standard channel card), and/or channel cards may be added to the data processing system. Adding and/or replacing channel cards may allow additional and/or improved computer-implemented services to be provided by the data processing system.

However, firmware of the non-standard channel card may not be previously established as trustworthy (e.g., a signed hash of the non-standard channel card firmware may not be included in the secure booting procedure database). As a result, the security processor may be unable to verify the non-standard channel card firmware and thus may be unable to boot the non-standard channel card firmware during the secure booting procedure. Consequently, computer-implemented services may not be provided as desired to a user of the data processing system.

To boot the non-standard channel card firmware, a management controller of the data processing system may perform a verification procedure to establish trust in the non-standard channel card by obtaining identifying information for the non-standard channel card firmware. After performing the verification procedure, the management controller may obtain a channel card certificate, which may be usable to verify that the non-standard channel card firmware is safe to boot and may be signed using a private key by an entity with authority to authorize firmware as being trustworthy (e.g., the private key of the management controller).

The management controller may then add at least one entry to the secure booting procedure database to facilitate verification of the non-standard channel card firmware. The management controller may resume the secure booting procedure, and the security processor may boot the non-standard channel card channel card firmware using the at least one entry. The data processing system may then provide the computer-implemented services using at least the non-standard channel card channel card.

Thus, embodiments disclosed herein may address, among other technical problems, the technical challenge of performing a secure booting procedure for channel cards operably connected to a data processing system. By dynamically updating a secure booting procedure database using a management controller of the data processing system, channel card firmware may be verified as trustworthy and may be allowed to boot. Booting of the channel card firmware may allow for the provision of computer-implemented services using the channel cards, which may result in different types and/or an improvement in quality of the computer-implemented services provided.

In an embodiment, a method for managing operation of a data processing system is disclosed. The method may include: identifying that firmware hosted by a channel card operably connected to the data processing system has failed verification during a secure booting procedure; performing, by a management controller of the data processing system, a verification procedure to obtain a channel card certificate; adding, by the management controller, at least one entry to a secure booting procedure database to facilitate verification of the firmware; after the at least one entry is added, resuming, by the management controller, the secure booting procedure; completing, using at least the at least one entry, the secure booting procedure to place the data processing system in an operable state that is conducive to providing computer-implemented services; and providing, while the data processing system is in the operable state, the computer-implemented services.

The management controller may be separate from and tasked with managing operation of hardware resources of the data processing system, the hardware resources including at least the channel card.

Performing the verification procedure may include obtaining identifying information for the firmware: via sideband channels of the data processing system, and without the identifying information traversing an operating system of the data processing system.

The channel card certificate may be signed using a private key of a public private key pair managed by an entity with authority to authorize firmware as being trustworthy to the data processing system, and may be usable to verify, at least in part, that the firmware is safe to boot.

The at least one entry may include a signed hash of the firmware, the signed hash being verifiable by the data processing system using an existing trusted key.

The at least one entry may include a signed hash of the firmware, the signed hash of the firmware being signed using a second private key of a second public private key pair; and the channel card certificate, the channel card certificate indicating that the second public private key pair is trustworthy.

Completing the secure booting procedure may include: obtaining, by secure booting software hosted by the data processing system, a hash of the firmware; making a determination, using at least the hash of the firmware and the secure booting procedure database, regarding whether the firmware is verified; in a first instance of the determination in which the firmware is verified: booting the firmware as a part of the secure booting procedure; and in a second instance of the determination in which the firmware is not verified: continuing the secure booting procedure without booting the firmware.

The operable state may allow application software to be run by at least an operating system of the data processing system.

In an embodiment, a non-transitory media is provided that may include instructions that when executed by a processor cause the computer-implemented method to be performed.

In an embodiment, a data processing system is provided that may include the non-transitory media and a processor, and may perform the computer-implemented method when the computer instructions are executed by the processor.

Turning to FIG. 1A, a block diagram illustrating a system in accordance with an embodiment is shown. The system shown in FIG. 1A may provide computer-implemented services using a data processing system. The computer-implemented services may include any type and quantity of computer-implemented services. For example, the computer-implemented services may include data storage services, instant messaging services, database services, data generation services, and/or any other type of service that may be implemented with a computing device. The computer-implemented services may be provided, at least in part, using various components of hardware resources of the data processing system, including channel cards (e.g., graphics cards, network interface cards (NICs), accelerator cards, expansion cards).

To provide the computer-implemented services, the data processing system may undergo a booting process (e.g., a startup) during which functionality of a portion of its hardware, software, and/or firmware components may be enabled.

To reduce the risk of compromise by malicious entities (e.g., via rootkits, bootkits, and/or other types of malware) during the booting process, a secure booting procedure may be performed. During the secure booting procedure, a security processor may perform security checks to establish trust in hardware components before booting by verifying firmware hosted by the hardware components. The security processor may host secure booting software (e.g., BIOS, UEFI) and a secure booting procedure database usable to verify the firmware. Following verification of the hardware components, the secure booting software may perform any number of actions (e.g., inventorying the hardware components, loading drivers and/or other software components, configuring hardware and/or software components) to boot the verified hardware components. In doing so, compromise of the data processing system by malicious entities during startup may be less likely by preventing hardware components from booting which cannot be verified (e.g., due to compromise by malware).

As part of performing the firmware verification, the security processor may perform a hash matching procedure. During the hash matching procedure, the security processor may obtain a copy of the firmware code for a hardware component and generate a hash (e.g., by using the copy of the firmware code as input to a predetermined hash function). The hash may be compared to signed hashes stored in the secure booting procedure database which have been verified as trustworthy by an authority with a trusted key (e.g., an original equipment manufacturer (OEM) of the data processing system, a trusted vendor). If the security processor identifies a signed hash which matches the hash of the firmware, the firmware may pass verification and the firmware and corresponding hardware component may boot.

Over time (e.g., after manufacturing or setup), hardware resources such as channel cards may be modified (e.g., by an end user). For example, a stock channel card may be replaced with a channel card with non-standard functions (e.g., an aftermarket channel card), and/or channel cards may be added to the data processing system. Functionality of the channel cards may vary to a high degree depending on the vendor (e.g., manufacturer of the channel card) and/or due to the programmable nature of some channel cards (e.g., SmartNICs, data processing unit (DPU) cards, etc.). By replacing and/or adding additional channel cards to the data processing system, different types of computer-implemented services and/or a higher quality of computer-implemented services may be provided by the data processing system.

However, the security processor may be unable to verify that replacement and/or additional channel cards are safe to boot during the secure booting procedure (e.g., a hash of the firmware for the replacement and/or additional channel cards may not be stored in the secure booting procedure database). Thus, the security processor may be unable to verify the channel cards, resulting in an inability to boot the channel card firmware during the secure booting procedure. As a result, the types of computer-implemented services provided by the data processing system may be limited and/or the computer-implemented services provided by the data processing system may be of a reduced quality.

In general, embodiments disclosed herein may provide methods, systems, and/or devices for managing operation of a data processing system in a manner that facilitates performance of a secure booting procedure of channel cards. To do so, a secure booting procedure database may be dynamically modified by a management entity of the data processing system (e.g., a management controller) upon notification (e.g., from a security processor responsible for performing the secure booting procedure) that firmware hosted by a channel card (e.g., channel card firmware) failed verification during the secure booting procedure.

To modify the secure booting procedure database, the management controller may first perform a verification procedure to obtain a channel card certificate. The verification procedure may include obtaining identifying information for the firmware (e.g., a model number, a serial number, a manufacturer/vendor, a device certificate signed using a private key of the manufacturer/vendor) and verifying that the identifying information corresponds to a trusted entity (e.g., performing a lookup in a trusted key database to identify a match to the private key, authenticating the private key using a corresponding public key, verifying trustworthiness by communicating with a trusted manufacturer/vendor via an out-of-band communication channel). After performing the verification procedure, the management controller may generate a channel card certificate useable to verify that the channel card firmware is safe to boot.

The management controller may add at least one entry to the secure booting procedure database to facilitate verification of the channel card firmware. The at least one entry may include a signed hash of the firmware (e.g., signed by a private key of a public private key pair maintained by the management controller, signed by a private key of a public private key pair included in the channel card certificate) and/or the channel card certificate. The management controller may then resume the secure booting procedure (e.g., via a notification to the security processor). The security processor may complete the secure booting procedure to boot the channel card firmware using secure booting software and the at least one entry to the secure booting procedure database. The data processing system may then be placed in an operable state and provide computer-implemented services.

By doing so, a system in accordance with an embodiment may be more likely to perform a secure booting procedure to boot channel card firmware by modifying a secure booting procedure database. The secure booting procedure database may be modified after verifying the trustworthiness of the channel card and obtaining a channel card certificate by a management controller of the data processing system. The ability to verify the channel card and dynamically update the secure booting procedure database may facilitate provision of computer-implemented services by the data processing system.

To perform the above-mentioned functionality, the system of FIG. 1A may include data processing system 102, management controller 152, and/or hardware resources 150. Data processing system 102, any components thereof and/or any other types of devices or components not shown in FIG. 1A may perform all, or a portion of the computer-implemented services independently and/or cooperatively. Each of these components is discussed below.

Hardware resources 150 may include any number of hardware components (e.g., memory, processors, channel cards). For example, hardware resources 150 may include any number of channel cards 154 (e.g., 154A-154N). Channel cards 154 may include expansion cards and/or adapter cards that may add specific functions to data processing system 102. Each channel card of channel cards 154 may be designed to perform a specific task and/or provide additional capabilities to data processing system 102 (e.g., beyond what other hardware components such as a motherboard of data processing system 102 may offer). For example, channel cards 154 may include graphics processing units (GPUs), network interface cards (NICs), storage controller cards, wireless network cards, Universal Serial Bus (USB) expansion cards, and/or other types of cards.

Channel cards 154 may include programmable platform devices capable of performing various functions in various different ways and/or some may require special methods of communication (e.g., specialized application programming interfaces (APIs)). In other words, some functionality of the channel cards may (i) not adhere to an industry standard for classes of channel cards, (ii) may be in addition to the functionality specified by the industry standard, and/or may otherwise require specialized or unusual information to utilize such functions. These functions may be referred to as non-standard functions.

Channel cards 154 may include standard channel cards (e.g., stock channel cards) that perform standard functions in compliance with an industry standard for a type of the channel cards (e.g., a class of the channel cards such as a GPU). Channel cards 154 may also include non-standard channel cards (e.g., aftermarket channel cards). The non-standard channel cards may perform the standard functions based on the type of the non-standard channel cards and at least one additional non-standard function.

Hardware resources 150 may also include security processor 156. Security processor 156 may include one or more hardware components which may provide secure booting services for data processing system 102. To provide the secure booting services, security processor 156 may host secure booting software (e.g., BIOS, UEFI) and may store (and/or may otherwise have access to) a secure booting procedure database (e.g., in local memory).

To perform its functionality, security processor 156 may (i) obtain copies of firmware code corresponding to firmware hosted by channel cards, (ii) calculate hash values (also referred to as "hashes") of the firmware code using a hash function (e.g., Secure Hash Algorithm 2 (SHA-2), other types of functions that may intake ingest and output hash values), (iii) perform lookups in the secure booting procedure database to identify whether the hashes match signed hashes, (iv) determine whether the channel card firmware passes verification based on the lookups (e.g., channel card firmware may pass if a matching signed hash is identified), (v) allow firmware to boot if verification is passed, (vi) notify other entities which participate in providing the secure booting services if the firmware fails verification (e.g., management controller 152) and/or (vii) perform other tasks to provide the secure booting services.

To facilitate provision of the secure booting services, data processing system 102 may include management controller 152. Management controller 152 may be separate from and tasked with managing operation of hardware resources 150. For example, management controller 152 may operate using a separately controllable power domain from hardware resources 150, which may allow management controller 152 to remain powered (e.g., booted) even when some or all of hardware resources 150 are unpowered. Because management controller 152 may remain powered, management controller 152 may be operable and able to facilitate secure booting of hardware resources 150 (e.g., cooperatively with security processor 156). Refer to the discussion of FIG. 1B for additional details regarding powering of components of data processing system 102.

To perform its functionality, management controller 152 may (i) receive notifications indicating firmware (e.g., of channel cards) has failed verification (e.g., from security processor 156), (ii) perform verification procedures to determine whether channel cards are trustworthy (e.g., obtaining identifying information from the channel cards, determining whether the identifying information corresponds to a trusted entity), (iii) obtain channel card certificates for channel cards verified to be trustworthy (e.g., generate the channel card certificates and sign with a private key of management controller 152), (iv) obtain signed hashes of firmware code corresponding to verified channel cards (e.g., obtain copies of the firmware code, calculate hashes of the code, sign the hashes using a private key of management controller 152 and/or another authorized entity), (iv) add entries into the secure booting procedure database (e.g., the channel card certificates, the signed hashes), (v) resume the secure booting procedure (e.g., provide notifications to security processor 156 to boot the verified channel cards), and/or (vi) perform other tasks to facilitate provision of the secure booting services.

Management controller 152 may be distinct from and/or may operate independently from hardware resources 150. Therefore, data utilized by management controller 152 during the above-mentioned operations (e.g., generating channel card certificates, signing hashes of firmware code, adding entries to the secure booting procedure database) may not traverse any in-band components of data processing system 102 (e.g., hardware resources 150). As a result, data processing system 102 may be at a reduced risk of compromise in the event of compromise (e.g., by a malicious entity) of any of hardware resources 150. To facilitate cooperation between hardware resources 150 and management controller 152, hardware resources 150 may host an agent for management controller 152 (not shown). The agent (e.g., a software program) may facilitate communication between management controller 152 and hardware resources 150. For example, the agent may facilitate the communication of copies of firmware code between hardware resources 150 and management controller 152. Refer to the discussion of FIG. 1B for more information regarding the functionality of management controller 152.

Figure 2A:
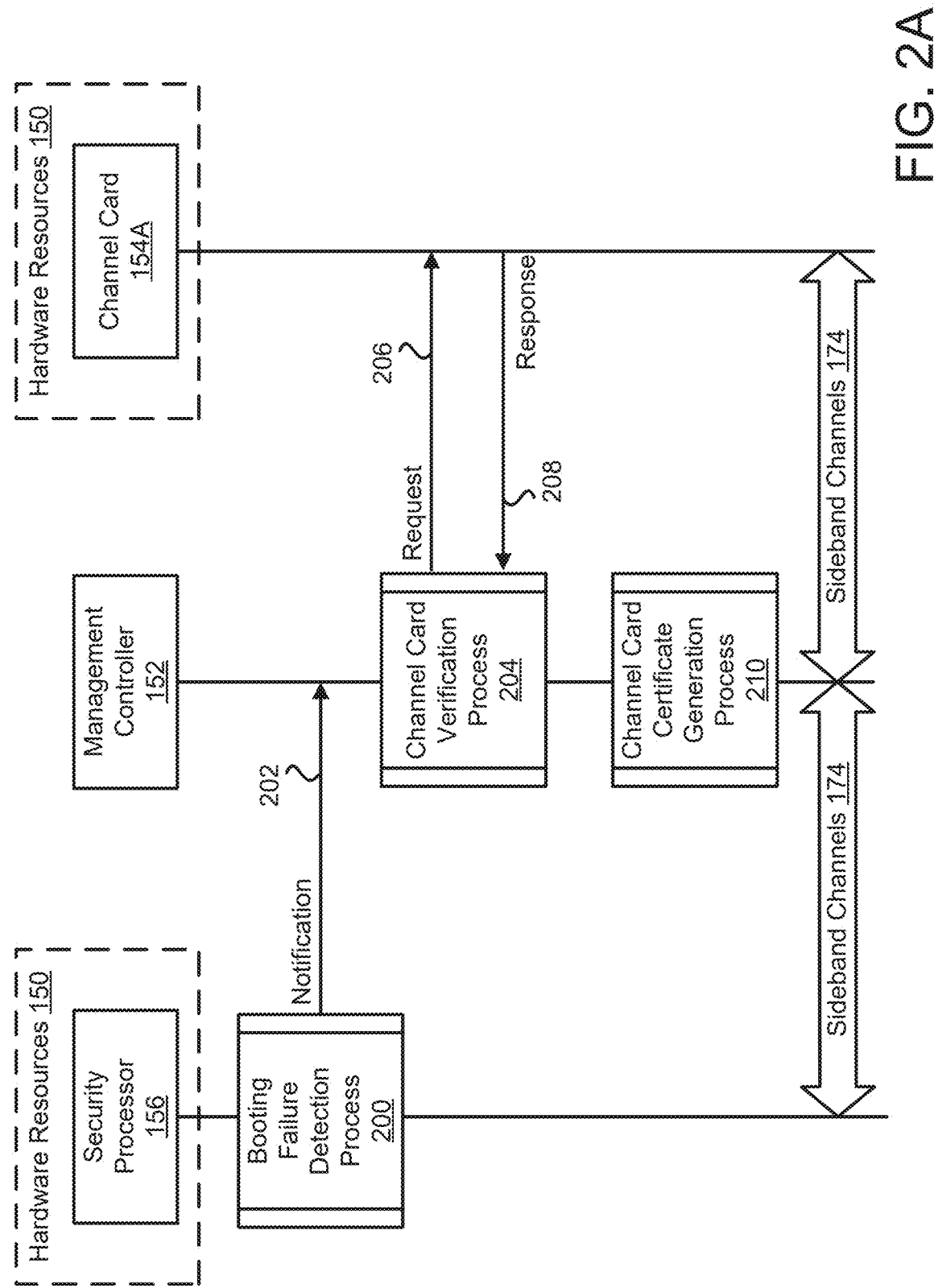
FIGS. 2A-2C show interaction diagrams in accordance with an embodiment.

When providing their functionality, any components of data processing system 102 may perform all, or a portion of the actions and methods illustrated in FIGS. 2A-3.

Data processing system 102 (and/or components thereof) may be implemented using a computing device (also referred to as a data processing system) such as a host or a server, a personal computer (e.g., desktops, laptops, and tablets), a "thin" client, a personal digital assistant (PDA), a Web enabled appliance, a mobile phone (e.g., smartphone), an embedded system, local controllers, an edge node, and/or any other type of data processing device or system. For additional details regarding computing devices, refer to the discussion of FIG. 4.

While illustrated in FIG. 1A as including a limited number of specific components, a system in accordance with an embodiment may include fewer, additional, and/or different components than those illustrated therein.

Figure 1B:
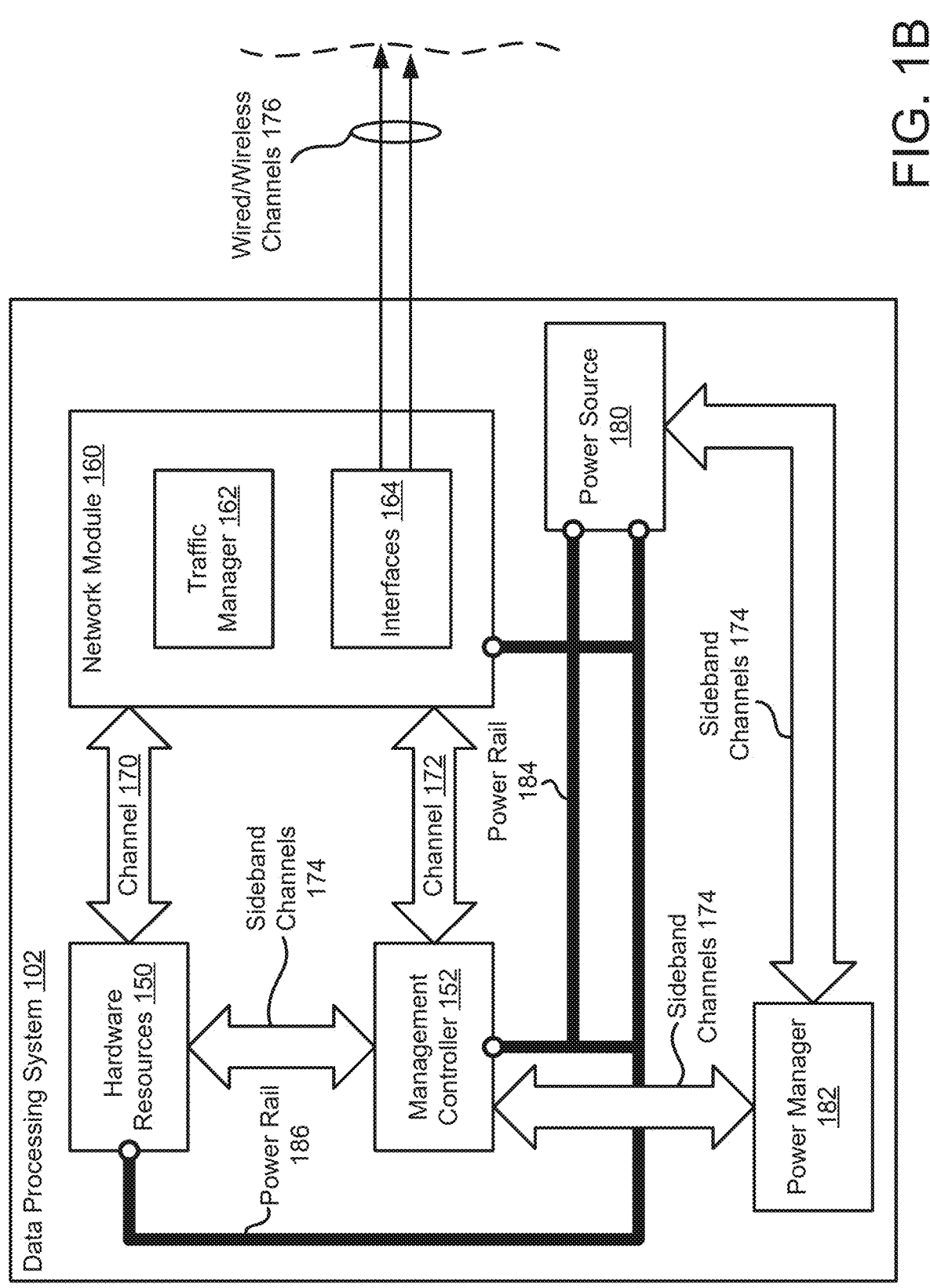
FIG. 1B shows a block diagram illustrating components of a data processing system in accordance with an embodiment.

Turning to FIG. 1B, a diagram illustrating components of a data processing system in accordance with an embodiment is shown. The components of the data processing system shown in FIG. 1B may be similar to those of the system shown in FIG. 1A.

To provide computer-implemented services, data processing system 102 may include any quantity of hardware resources 150. Hardware resources 150 may be in-band hardware components, and may include a processor operably coupled to memory, storage, channel cards, and/or other hardware components.

The processor may host various management entities such as operating systems, drivers, network stacks, and/or other software entities that provide various management functionalities. For example, the operating system and drivers may provide abstracted access to various hardware resources. Likewise, the network stack may facilitate packaging, transmission, routing, and/or other functions with respect to exchanging data with other devices.

For example, the network stack may support transmission control protocol/internet protocol communication (TCP/IP) (e.g., the Internet protocol suite) thereby allowing the hardware resources 150 to communicate with other devices via packet switched networks and/or other types of communication networks.

The processor may also host various applications that provide the computer-implemented services. The applications may utilize various services provided by the management entities and use (at least indirectly) the network stack to communicate with other entities.

However, use of the network stack and the services provided by the management entities may place the applications at risk of indirect compromise. For example, if any of these entities trusted by the applications are compromised, these entities may subsequently compromise the operation of the applications. For example, if various drivers and/or the communication stack are compromised, communications to/from other devices may be compromised. If the applications trust these communications, then the applications may also be compromised.

For example, to communicate with other entities, an application may generate and send communications to a network stack and/or driver, which may subsequently transmit a packaged form of the communication via channel 170 to a communication component, which may then send the packaged communication (in a yet further packaged form, in some embodiments, with various layers of encapsulation being added depending on the network environment outside of data processing system 102) to another device via any number of intermediate networks (e.g., via wired/wireless channels 176 that are part of the networks).

To reduce the likelihood of the applications and/or other in-band entities from being indirectly compromised, data processing system 102 may include management controller 152 and network module 160. Each of these components of data processing system 102 is discussed below.

Management controller 152 may be implemented, for example, using a system on a chip or other type of independently operating computing device (e.g., independent from the in-band components, such as hardware resources 150, of a host data processing system 102). Management controller 152 may provide various management functionalities for data processing system 102. For example, management controller 152 may monitor various ongoing processes performed by the in-band components, may manage power distribution, may participate in thermal management, and/or other may perform other functions, such as participating in the provision of secure booting services for data processing system 102.

To do so, management controller 152 may be operably connected to various components via sideband channels 174 (in FIG. 1B, a limited number of sideband channels are included for illustrative purposes, it will be appreciated that management controller 152 may communicate with other components via any number of sideband channels). The sideband channels may be implemented using separate physical channels, and/or with a logical channel overlay over existing physical channels (e.g., logical division of in-band channels). The sideband channels may allow management controller 152 to interface with other components and implement various management functionalities such as, for example, general data retrieval (e.g., to snoop ongoing processes), telemetry data retrieval (e.g., to identify a health condition/other state of another component), function activation (e.g., sending instructions that cause the receiving component to perform various actions such as displaying data, adding data to memory, causing various processes to be performed), and/or other types of management functionalities.

For example, sideband channels 174 may facilitate communications between management controller 152 and hardware resources 150 so that management controller 152 may obtain copies of firmware code corresponding to channel cards which have failed verification during secure booting. Additionally, management controller 152 may use sideband channels 174 to communicate with security processor 156 regarding channel cards which have failed verification and/or to resume secure booting procedures.

To reduce the likelihood of indirect compromise of an application hosted by hardware resources 150, management controller 152 may enable information from other devices to be provided to the application without traversing the network stack and/or management entities of hardware resources 150. To do so, the other devices may direct communications including the information to management controller 152. Management controller 152 may then, for example, send the information via sideband channels 174 to hardware resources 150 (e.g., to store it in a memory location accessible by the application, such as a shared memory location, a mailbox architecture, or other type of memory-based communication system) to provide it to the application. Thus, the application may receive and act on the information without the information passing through potentially compromised entities. Consequently, the information may be less likely to also be compromised, thereby reducing the possibility of the application becoming indirectly compromised. Similarly, processes may be used to facilitate outbound communications from the applications.

Management controller 152 may be operably connected to communication components of data processing system 102 via separate channels (e.g., 172) from the in-band components, and may implement or otherwise utilize a distinct and independent network stack (e.g., TCP/IP). Consequently, management controller 152 may communicate with other devices independently of any portion of the in-band components (e.g., does not rely on any hosted software, hardware components, etc.). Accordingly, compromise of any of hardware resources 150 and hosted component may not result in indirect compromise of any management controller 152, and entities hosted by management controller 152.

To facilitate communication with other devices, data processing system 102 may include network module 160. Network module 160 may provide communication services for in-band components and out-of-band components (e.g., management controller 152) of data processing system. To do so, network module 160 may include traffic manager 162 and interfaces 164.

Traffic manager 162 may include functionality to (i) discriminate traffic directed to various network endpoints advertised by data processing system 102, and (ii) forward the traffic to/from the entities associated with the different network endpoints. For example, to facilitate communications with other devices, network module 160 may advertise different network endpoints (e.g., different media access control address/internet protocol addresses) for the in-band components and out-of-band components. Thus, other entities may address communications to these different network endpoints. When such communications are received by network module 160, traffic manager 162 may discriminate and direct the communications accordingly (e.g., over channel 170 or channel 172, in the example shown in FIG. 1B, it will be appreciated that network module 160 may discriminate traffic directed to any number of data units and direct it accordingly over any number of channels).

Accordingly, traffic directed to management controller 152 may never flow through any of the in-band components. Likewise, outbound traffic from the out-of-band component may never flow through the in-band components.

To support inbound and outbound traffic, network module 160 may include any number of interfaces 164. Interfaces 164 may be implemented using any number and type of communication devices which may each provide wired and/or wireless communication functionality. For example, interfaces 164 may include a wide area network card, a Wi-Fi card, a wireless local area network card, a wired local area network card, an optical communication card, and/or other types of communication components. These components may support any number of wired/wireless channels 176.

Thus, from the perspective of an external device, the in-band components and the out-of-band components of data processing system 102 may appear to be two independent network entities, that may independently addressable, and otherwise unrelated to one another.

To facilitate management of data processing system 102 over time, hardware resources 150, management controller 152 and/or network module 160 may be positioned in separately controllable power domains. By being positioned in these separately power domains, different subsets of these components may remain powered while other subsets are unpowered.

For example, management controller 152 and network module 160 may remain powered while hardware resources 150 is unpowered. Consequently, management controller 152 may remain able to communicate with other devices even while hardware resources 150 are inactive. Similarly, management controller 152 may perform various actions while hardware resources 150 are not powered and/or are otherwise inoperable, unable to cooperatively perform various process, are compromised, and/or are unavailable for other reasons. For example, management controller 152 may participate in secure booting procedures (e.g., cooperatively with security processor 156) to facilitate booting of hardware components of hardware resources 150 due to remaining powered (e.g., booted) even when some and/or all of hardware resources 150 are unpowered.

To implement the separate power domains, data processing system 102 may include a power source (e.g., 180) that separately supplies power to power rails (e.g., power rail 184, power rail 186) that power the respective power domains. Power from the power source (e.g., a power supply, battery, etc.) may be selectively provided to the separate power rails to selectively power the different power domains. A power manager (e.g., 182) may manage power from power source 180, and power may be supplied via the power rails. Management controller 152 may cooperate with power manager 182 to manage supply of power to these power domains. Management controller 152 may communicate with power manager 182 via sideband channels 174 and/or via other means.

In FIG. 1B, an example implementation of separate power domains using power rails 184-186 is shown. The power rails may be implemented using, for example, bus bars or other types of transmission elements capable of distributing electrical power. While not shown, it will be appreciated that the power domains may include various power management components (e.g., fuses, switches, etc.) to facilitate selective distribution of power within the power domains.

While illustrated in FIG. 1B with a limited number of specific components, a system may include additional, fewer, and/or different components without departing from embodiments disclosed herein.

Figure 2B:
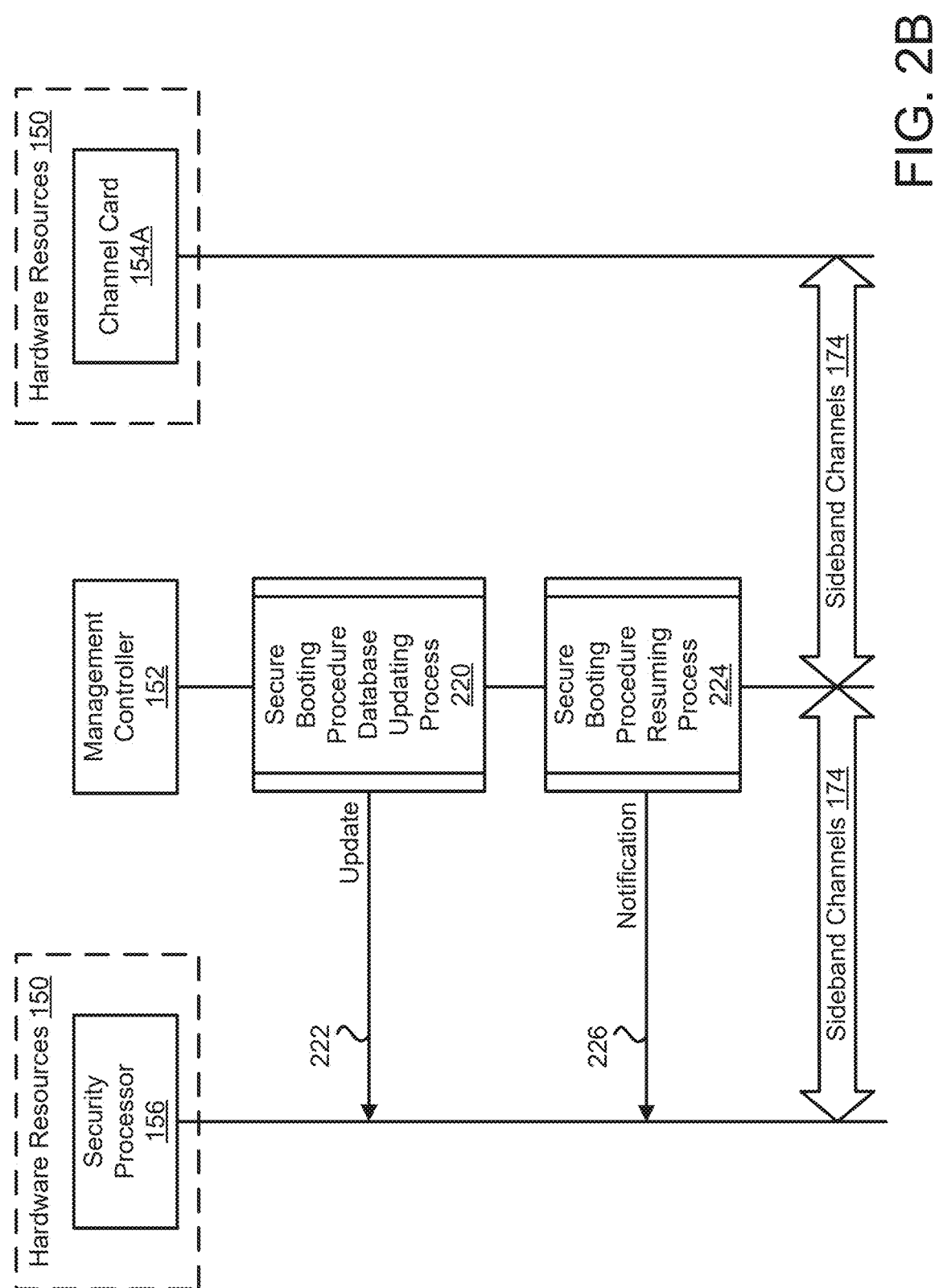
Figure 2C:
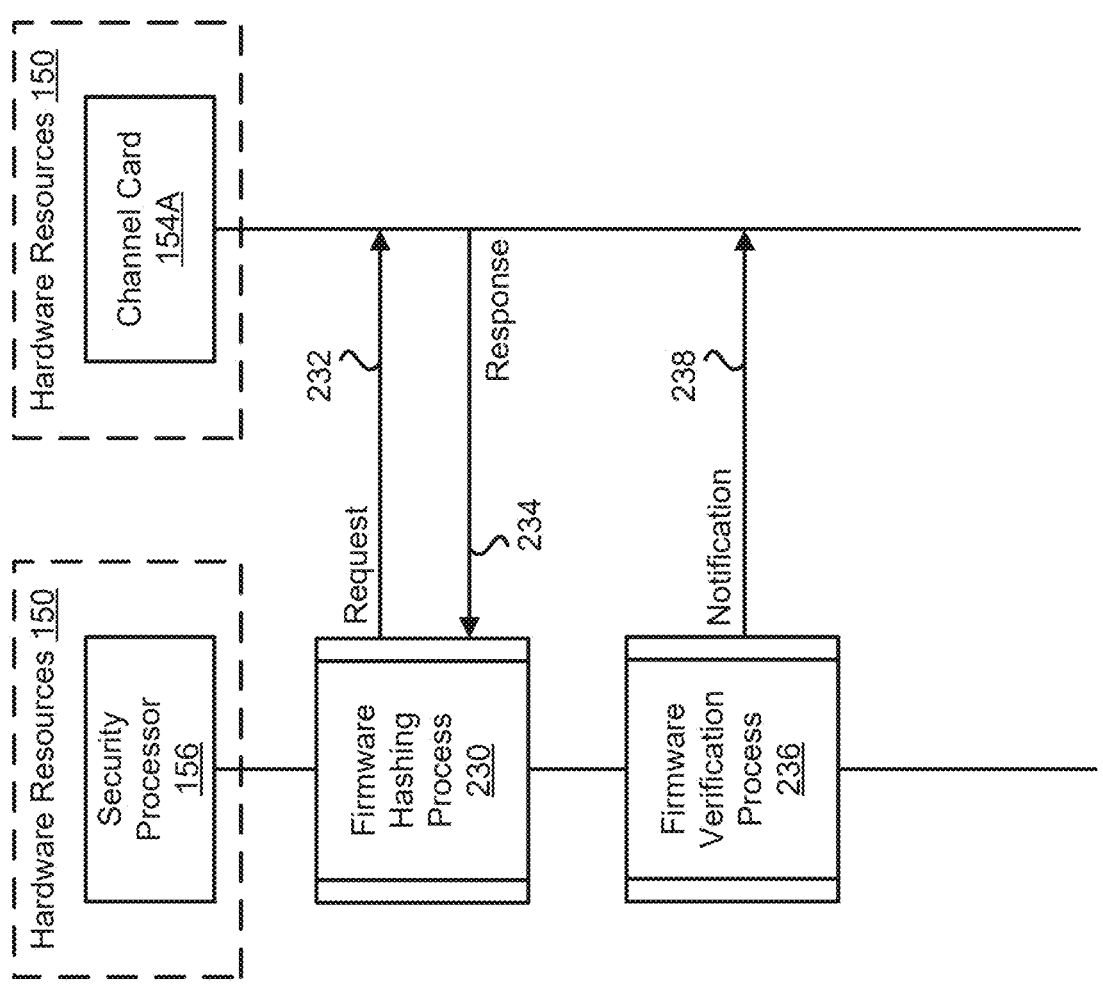

To further clarify embodiments disclosed herein, interaction diagrams in accordance with an embodiment are shown in FIGS. 2A-2C. The interaction diagrams may illustrate examples of how data may be obtained and used within the systems of FIGS. 1A-1B. In the examples shown in FIGS. 2A-2C, a data processing system (e.g., 102) may include components such as hardware resources 150 and management controller 152. Hardware resources 150 may include channel card 154A and/or security processor 156. The components of the data processing system may be similar to and/or include functionality similar to those described with respect to FIGS. 1A-1B.

In the interaction diagrams, processes performed by and interactions between components of a system in accordance with an embodiment are shown. In the diagrams, components of the system are illustrated using a first set of shapes (e.g., 152, 154A, etc.), located towards the top of each figure. Lines descend from these shapes. Processes performed by the components of the system are illustrated using a second set of shapes (e.g., 200, 204, etc.) superimposed over these lines.

Interactions (e.g., communication, data transmissions, etc.) between the components of the system are illustrated using a third set of shapes (e.g., 202, 206, etc.) that extend between the lines. The third set of shapes may include lines terminating in an arrow. Lines terminating in an arrow may indicate that one-way interactions (e.g., data transmission from a first component to a second component) occur.

Generally, the processes and interactions are temporally ordered in an example order, with time increasing from the top to the bottom of each page. For example, the interaction labeled as 202 may occur prior to the interaction labeled as 206. However, it will be appreciated that the processes and interactions may be performed in different orders, any may be omitted, and other processes or interactions may be performed without departing from embodiments disclosed herein.

Turning to FIG. 2A, a first interaction diagram in accordance with an embodiment is shown. The first interaction diagram may illustrate processes and interactions that may occur when firmware hosted by a channel card (e.g., channel card 154A) fails verification during a secure booting procedure. When the firmware hosted by channel card 154A fails verification, management controller 152 may perform a verification procedure to determine whether the firmware hosted by channel card certificate 154A is safe to boot.

To identify that channel card 154A has failed verification during a secure booting procedure, booting failure detection process 200 may be performed by security processor 156. Booting failure detection process 200 may be performed as part of a secure booting procedure used to start up the hardware resources (e.g., enable functionality) of the data processing system by verifying that firmware hosted by the hardware resources has been designated as trustworthy by an entity with authority over the data processing system. Refer to the discussion of FIG. 2C for additional details regarding the secure booting procedure.

During booting failure detection process 200, security processor 156 may determine that firmware hosted by channel card 154A (e.g., channel card 154A firmware) has failed verification (e.g., a hash of channel card 154A firmware does not match a signed hash in a secure booting procedure database). Channel card 154A may fail verification during a secure booting procedure (i) upon the installation of channel card 154A due to not being previously recognized and/or booted by security processor 156 (e.g., during the first boot up of a newly added channel card 154A), (ii) upon detection of a change in channel card 154A firmware (e.g., after the firmware has been updated, due to being compromised by malware), and/or (iii) other reasons.

For example, a user of the data processing system may decide to replace a stock graphics card with an aftermarket graphics card to improve a quality of computer-implemented gaming services provided by the data processing system. During the first secure booting procedure of the data processing system after installation of the aftermarket graphics card, the aftermarket graphics card may fail verification (e.g., due to a hash of the firmware not matching a signed hash in the secure booting procedure database, refer to FIG. 2C).

Detection of the failed verification of channel card 154A firmware may result in a notification being provided by security processor 156 to management controller 152 at interaction 202. The notification may include a message indicating at least (i) an identifier for the firmware that failed verification during the secure booting procedure, (ii) a timestamp for the failed verification, and/or (iii) other information usable to investigate the failed verification for the firmware. The notification may be provided to management controller 152 by (i) transmission via a message, (ii) storing in a storage with subsequent retrieval by management controller 152, (iii) a publish-subscribe system where management controller 152 subscribes to updates from security processor 156 thereby causing a copy of the notification to be propagated to management controller 152, and/or (iv)

other processes. The notification may be provided, for example, via sideband channels 174. By providing the notification to management controller 152, the performance of channel card verification process 204 may be initiated.

Once a notification regarding the failed verification has been obtained by management controller 152, channel card verification process 204 may be performed (e.g., automatically upon receiving the notification) in order to determine whether channel card 154A firmware is safe to boot. Channel card verification process 204 may include at least interactions 206 and 208. During channel card verification process 204, management controller 152 may request and/or obtain identifying information for the channel card 154A firmware (e.g., using a security protocol and data model (SPDM)) without the identifying information traversing an operating system of the data processing system.

While verification process 204 is shown with respect to interactions 206 and 208, it may be appreciated that channel card verification process 204 may include any number of interactions between management controller 152 and channel card 154A in order to verify the channel card 154A firmware.

Channel card verification process 204 may include providing a request to channel card 154A at interaction 206 (e.g., via sideband channels 174). Management controller 152 may provide the request by (i) transmission via a message, (ii) storing in a storage with subsequent retrieval by channel card 154A, (iii) a publish-subscribe system where channel card 154A subscribes to updates from management controller 152 thereby causing a copy of the request to be propagated to channel card 154A, and/or (iv) other processes.

For example, the identifying information requested at interaction 206 from channel card 154A (e.g., via the request) may include (i) information regarding channel card 154A (e.g., a model number, a serial number, a card type, a manufacturer, a vendor), (ii) device measurements (e.g., processor speeds, storage capacity, data transmission speeds), (iii) a copy of the firmware code, (iv) any device certificates and/or device certificate chains stored by channel card 154A which are signed by private keys of authoritative entities (e.g., the manufacturer, the vendor), and/or (v) other information regarding channel card 154A. Channel card 154A may read the request and obtain a response to the request, the response including the requested information (e.g., device measurements, copy of the firmware code, device certificates, and/or other information).

At interaction 208, the response may be provided to management controller 152 by channel card 154A (e.g., via sideband channels 174) by (i) transmission via a message, (ii) storing in a storage with subsequent retrieval by management controller 152, (iii) a publish-subscribe system where management controller 152 subscribes to updates from channel card 154A thereby causing a copy of the response to be propagated to management controller 152, and/or (iv) other processes. Upon obtaining the response, management controller 152 may continue performance of channel card verification process 204.

During channel card verification process 204, management controller 152 may read the response to determine whether the information provided in the response permits channel card 154A to be verified. For example, the response may include a copy of a certificate signed using a first private key of a first public private key pair maintained by a manufacturer of channel card 154A (e.g., a device certificate). The device certificate may indicate that firmware of channel card 154A is trusted by a root of trust for the data processing system (e.g., a manufacturer of the data processing system) and, therefore, is safe to boot.

However, management controller 152 may not trust the manufacturer of channel card 154 (e.g., a first public key of the first public private key pair may not be stored in a trusted key database maintained by management controller 152). To determine whether the signature of the device certificate is trustworthy, management controller 152 may obtain an intermediate certificate (e.g., from a remote entity such as the manufacturer of channel card 154A via an out-of-band communication channel (not shown)). The intermediate certificate may indicate that the manufacturer of channel card 154A is a trusted manufacturer (e.g., may include the first public key of the first public private key pair maintained by the manufacturer of channel card 154A) and the intermediate certificate may be signed using a second private key of a second public private key pair maintained by the root of trust.

Management controller 152 may obtain a second public key of the second public private key pair from the trusted key database. The trusted key database may include public keys of public private key pairs known to be trustworthy by the data processing system (e.g., not malicious). For example, the second public key may be added to the trusted key database at a time of manufacturing for the data processing system. Using the second public key, management controller 152 may verify that the intermediate certificate was signed using the second private key (e.g., of the root of trust). In addition, management controller 152 may use the first public key included in the intermediate certificate to verify that the device certificate was signed using the first private key.

By doing so, management controller 152 may determine whether a chain of certificates (e.g., the device certificate, the intermediate certificate) includes a cryptographically verifiable chain of delegations of trust between the root of trust for the data processing system and the firmware of channel card 154A.

Management controller 152 may make the determination regarding whether the information provided in the response permits channel card 154A to be verified (e.g., if the response from channel card 154A does not include device certificates and/or the device certificates cannot be verified) by communicating with a trusted entity (not shown). For example, management controller 152 may communicate with a remote system or device (e.g., a trusted manufacturer's system such as the manufacturer of the data processing system and/or a manufacturer of the channel card indicated in the response which is known to be trustworthy) based on other identifying information provided by channel card 154A. Management controller 152 may use out-of-band communication channels to communicate with the remote system or device, which may allow for the communication to occur even if hardware resources of the data processing system have not been booted.

Management controller 152 may provide the identifying information and/or other data regarding channel card 154A to the remote system or device, which may provide a response indicating whether channel card 154A is verified. For example, management controller 152 may provide a copy of the channel card 154A firmware and/or a hash of the channel card 154A firmware to a trusted manufacturer's system for verification that channel card 154A is authentic (e.g., from the trusted manufacturer) and/or trustworthy (e.g., does not include malware and/or other malicious code).

Once channel card 154A has been verified during channel card verification process 204, management controller 152 may perform channel card certificate generation process 210. During channel card certificate generation process 210, a channel card certificate may be generated and/or obtained by management controller 152 which is usable to verify, at least in part, that the channel card 154A firmware is safe to boot. The channel card certificate may be signed using a private key of a public private key pair managed by an entity with authority to authorize firmware as being trustworthy to the data processing system. For example, the channel card certificate may be signed using a private key of management controller 152, which may be part of a public private key pair in the trusted key database (and/or any other private key which is part of a public private key pair in the trusted key database).

The channel card certificate may include a second public key of a second public private key pair. Therefore, the signed channel card certificate may indicate that a second private key of the second public private key pair is trusted to sign hashes of the firmware from channel card 154A. Refer to FIG. 2B for additional details regarding signing hashes of the firmware using the channel card certificate.

Thus, the processes and interactions shown in FIG. 2A may be used to obtain channel card certificates for channel cards which have failed verification during a secure booting procedure. The channel card certificates may be usable to verify that channel card firmware is safe to boot, and may be generated by a management controller of the data processing system after performing a verification procedure to verify the trustworthiness of the channel cards.

Turning to FIG. 2B, a second interaction diagram in accordance with an embodiment is shown. The second interaction diagram may illustrate processes and interactions that may occur to update a secure booting procedure database by management controller 152 to include an entry usable to boot a channel card (e.g., channel card 154A). After the addition of the entry to the secure booting procedure database, booting of the channel card may resume.

To update the secure booting procedure database, management controller 152 may perform secure booting procedure database updating process 220. During secure booting procedure database updating process 220, management controller 152 may add at least one entry to the secure booting procedure database to facilitate verification of the channel card firmware (e.g., channel card 154A firmware). The secure booting procedure database may include signed hashes (e.g., hashes of firmware code which have been verified as trustworthy and signed by a private key of a trusted entity), certificates (e.g., channel card certificates, certificates corresponding to other hardware components), and/or other data usable to verify whether firmware hosted by a hardware component is safe to boot. The at least one entry may include (i) a signed hash of the firmware, (ii) the channel card certificate, and/or (iii) other data to facilitate verification of the channel card firmware.

To obtain the signed hash of the channel card 154A firmware, management controller 152 may obtain a copy of the firmware code from channel card 154A (e.g., reading the firmware code from local memory of channel card 154A, providing a request to channel card 154A and receiving the copy of the firmware code in response). The copy of the firmware code may be used as input for a predetermined hash function used during the secure booting procedure (e.g., Secure Hash Algorithm 2 (SHA-2), any other type of functions which output hashes based on input) and a hash of the firmware may be obtained as output. The hash of the firmware may include a reduced-size representation of the copy of the firmware code and may be used as an identifier for the channel card 154A firmware.

In order to add the hash of the firmware to the secure booting procedure database to verify channel card 154A during secure booting procedures, the hash of the firmware may be signed using a private key of an authorized entity. The hash of the firmware may be signed by (i) management controller 152 (e.g., using the private key of management controller 152, which may be part of a public private key pair in the trusted key database), (ii) an intermediate entity (e.g., using a second private key corresponding to the second public key designated as trustworthy by a signature of the channel card certificate), and/or (iii) another entity with authority to authorize firmware as being trustworthy.

The channel card certificate may also be added to the secure booting procedure database as part of the at least one entry. In doing so, the second private key may be used to sign hashes for channel card 154A if the firmware code is updated and/or otherwise changes. For example, an after-market graphics card may be added to the data processing system. A copy of the firmware code may be hashed and signed by a manufacturer of the aftermarket graphics card. A public key corresponding to the private key used to sign the hash of the aftermarket graphics card firmware may be designated as trustworthy (e.g., via a verification process similar to channel card verification process 204 in FIG. 2A). Therefore, security process 156 may store a copy of a certificate indicating that the manufacturer of the aftermarket graphics card is authorized to update firmware of the aftermarket channel card (e.g., via signing firmware updates using the second private key). Over time, the firmware of the graphics card may be updated (e.g., to upgrade a security feature). After the update to the firmware, the graphics card may fail verification during a secure booting procedure. In response, a copy of a hash of the updated firmware code may be obtained, and the updated hash may be signed using the private key of the manufacturer of the aftermarket graphics card. The signed updated hash may then be added to the secure booting procedure database and used to boot the graphics card.

After the entry is added to the secure booting procedure database, an update may be provided by management controller 152 to security processor 156 at interaction 222 (e.g., via sideband channels 174). The update may be provided by (i) transmission via a message, (ii) storing in a storage with subsequent retrieval by security processor 156, (iii) a publish-subscribe system where security processor 156 subscribes to updates from management controller 152 thereby causing a copy of the update to be propagated to security processor 156, and/or (iv) other processes. The update may include (i) the entry added to the secure booting procedure database and instructions indicating the entry should be added to a copy of the secure booting procedure database hosted by security processor 156, (ii) an updated secure booting procedure database which includes the entry and instructions to sync and/or replace the copy of the secure booting procedure database hosted by security processor 156 with the updated version, and/or (iii) other data usable to update the secure booting procedure database hosted by security processor 156 with the entry.

Secure booting procedure resuming process 224 may then be performed. During secure booting procedure resuming process 224, management controller 152 may provide a notification to security processor 156 at interaction 226 (e.g., via sideband channel 174). The notification may be provided by (i) transmission via a message, (ii) storing in a storage with subsequent retrieval by security processor 156, (iii) a publish-subscribe system where security processor 156 subscribes to updates from management controller 152 thereby causing a copy of the update to be propagated to security processor 156, and/or (iv) other processes. The notification may indicate that security processor 156 is to resume and/or repeat the secure booting procedure for channel card 154A.

Thus, the processes and interactions shown in FIG. 2B may be used to update the secure booting procedure database by management controller 152 to include an entry usable to facilitate verification of channel card firmware. After updating the secure booting procedure database, the secure booting procedure may resume to boot the channel card.

Turning to FIG. 2C, a third interaction diagram in accordance with an embodiment is shown. The third interaction diagram may illustrate processes and interactions that may occur to complete a secure booting procedure for a channel card by security processor 156 (e.g., after updating the secure booting procedure database) in order to provide computer-implemented services using the channel card.

To complete the secure booting procedure for channel card 154A, security processor 156 may perform firmware hashing process 230. Firmware hashing process 230 may include interactions 232 and 234. During firmware hashing process 230, secure booting software hosted by security processor 156 (e.g., BIOS, UEFI) may obtain a hash of the firmware using a copy of the firmware code. To obtain the hash of the firmware, security processor 156 may provide a request for a copy of the firmware code at interaction 232 (e.g., via an in-band communication channel) by (i) transmission via a message, (ii) storing in a storage with subsequent retrieval by channel card 154A, (iii) a publish-subscribe system where channel card 154A subscribes to updates from security processor 156 thereby causing a copy of the request to be propagated to channel card 154A, and/or (iv) other processes.

Channel card 154A may provide a response to the request at interaction 234 which may include a copy of the firmware code. The response may be provided (e.g., via an in-band communication channel) by (i) transmission via a message, (ii) storing in a storage with subsequent retrieval by security processor 156, (iii) a publish-subscribe system where security processor 156 subscribes to updates from channel card 154A thereby causing a copy of the response to be propagated to security processor 156, and/or (iv) other processes.

While described with respect to providing a request for a copy of the firmware code and receiving the copy of the firmware code in response, it will be appreciated that security processor 156 may also obtain a copy of the firmware code by reading the code from local memory of channel card 154A and generating a copy, and/or other methods.

Upon obtaining the copy of the firmware code, security processor 156 may continue performance of firmware hashing process 230. Using the copy of the firmware code and a predetermined hash function, security processor 156 may obtain a hash of the firmware. For additional details regarding obtaining the hash using the predetermined hash function, refer to FIG. 2B.

After obtaining the hash of the firmware, security processor 156 may perform firmware verification process 236. During firmware verification process 236, a determination may be made by security processor 156 regarding whether the firmware is verified using at least the hash of the firmware and the secure booting procedure database. To make the determination, a hash matching procedure may be performed. During the hash matching procedure, the hash of the firmware may be compared to signed hashes in the secure booting procedure database to identify a match. For example, the hash of the firmware may match a signed hash if the difference between the hashes is zero, and the hash of the firmware may not match a signed hash if the difference between the hashes in nonzero. The firmware may be verified if a matching signed hash from the secure booting procedure database is identified.

If the firmware is not verified (e.g., a matching signed hash is not identified), security processor 156 may continue the secure booting procedure without booting the firmware (e.g., channel card 154A may not be booted). If the firmware is verified (e.g., a matching signed hash is identified), security processor 156 may boot the firmware as a part of the secure booting procedure (e.g., channel card 154A may be booted).

To boot the channel card 154A firmware as a part of the secure booting procedure, security processor 156 may provide a notification to channel card 154A at interaction 238 (e.g., via an in-band communication channel). The notification may include information indicating channel card 154A firmware may boot, instructions for channel card 154A firmware to boot, and/or other information. The notification may be provided (e.g., via an in-band communication channel) by (i) transmission via a message, (ii) storing in a storage with subsequent retrieval by channel card 154A, (iii) a publish-subscribe system where channel card 154A subscribes to updates from security processor 156 thereby causing a copy of the notification to be propagated to channel card 154A, and/or (iv) other processes.

Upon receiving the notification, channel card 154A firmware may boot and thus complete the secure booting procedure. Completion of the secure booting procedure may allow the data processing system to be placed in an operable state that is conducive to providing computer-implemented services. To place the data processing system in the operable state, operation management of the data processing system may be handed off from the secure booting software to an operating system or other type of operational management entity that places the data processing system into an operable state. The operable state may allow application software to be run by at least the operating system of the data processing system. The computer-implemented services may then be provided while the data processing system is in the operable state.

Thus, the processes and interactions shown in FIG. 2C may be used to complete a secure booting procedure to place the data processing system in an operable state usable to provide computer-implemented services. Completing the secure booting procedure may include obtaining a hash of the channel card firmware and performing a hash matching procedure using a secure booting procedure database. If a signed hash is identified in the secure booting procedure database which matches the hash of the channel card firmware, the channel card firmware may boot. The data processing system may then provide the computer-implemented services using the channel card.

Any of the processes illustrated using the second set of shapes and interactions illustrated using the third set of shapes may be performed, in part or whole, by digital processors (e.g., central processors, processor cores, etc.) that execute corresponding instructions (e.g., computer code/software). Execution of the instructions may cause the digital processors to initiate performance of the processes. Any portions of the processes may be performed by the digital processors and/or other devices. For example, executing the instructions may cause the digital processors to perform actions that directly contribute to performance of the processes, and/or indirectly contribute to performance of the processes by causing (e.g., initiating) other hardware components to perform actions that directly contribute to the performance of the processes.

Any of the processes illustrated using the second set of shapes and interactions illustrated using the third set of shapes may be performed, in part or whole, by special purpose hardware components such as digital signal processors, application specific integrated circuits, programmable gate arrays, graphics processing units, data processing units, and/or other types of hardware components. These special purpose hardware components may include circuitry and/or semiconductor devices adapted to perform the processes. For example, any of the special purpose hardware components may be implemented using complementary metal-oxide semiconductor-based devices (e.g., computer chips).

Any of the processes and interactions may be implemented using any type and number of data structures. The data structures may be implemented using, for example, tables, lists, linked lists, unstructured data, data bases, and/or other types of data structures. Additionally, while described as including particular information, it will be appreciated that any of the data structures may include additional, less, and/or different information from that described above. The informational content of any of the data structures may be divided across any number of data structures, may be integrated with other types of information, and/or may be stored in any location.

As discussed above, the components of FIGS. 1A-2C may perform various methods to manage the operation of data processing systems. FIG. 3 illustrates a method that may be performed by the components of the system of FIGS. 1A-2C. In the diagram discussed below and shown in FIG. 3, any of the operations may be repeated, performed in different orders, and/or performed in parallel with or in a partially overlapping in a timely manner with other operations. The method described with respect to FIG. 3 may be performed by a data processing system, any component of a data processing system (e.g., a management controller, hardware resources, a security processor) and/or another device.

Turning to FIG. 3, a flow diagram illustrating a method in accordance with an embodiment is shown. The flow diagram may illustrate various operations performed while managing operation of a data processing system. The data processing system may include hardware resources and a management controller, and may be similar to the data processing system discussed with respect to FIGS. 1A-1B.

At operation 300, it may be identified that firmware hosted by a channel card operably connected to the data processing system has failed verification during a secure booting procedure. Identifying that the firmware has failed verification may include (i) performing a hash matching procedure using a secure booting procedure database, (ii) determining that there is not a signed hash which matches a hash of the firmware in the secure booting procedure database, (iii) obtaining a notification (e.g., generating the notification, receiving the notification via a message over a communication channel such as a sideband channel of the data processing system) indicating that the channel card firmware has failed verification, and/or (iv) other processes.

Performing the hash matching procedure may include (i) obtaining a copy of the firmware code (e.g., via requesting the copy of the firmware code from the channel card), (ii) using the copy of the firmware code as input to a predetermined hash function (e.g., SHA-2) and obtaining a hash as output, (iii) identifying whether the hash matches a signed hash in the secure booting procedure database, and/or (iv) other processes.

Identifying whether the hash matches a signed hash may include comparing the hash to a signed hash in the secure booting procedure database to obtain a difference. The difference may be zero (e.g., when the hash values match) or nonzero (e.g., when the hash values do not match). A determination may be made regarding whether the channel card firmware passes verification by reading the difference. For example, if the difference is zero, the channel card firmware may pass verification. Otherwise, if the difference is nonzero, then the channel card firmware may fail verification.

At operation 302, a verification procedure may be performed by the management controller of the data processing system to obtain a channel card certificate. The verification procedure may be performed via sideband channels and without traversing an operating system of the data processing system. Performing the verification procedure may include (i) obtaining identifying information for the firmware from the channel card (e.g., using a security protocol and data model (SPDM)), (ii) performing a lookup in a trusted key database using the identifying information, (iii) communicating with one or more remote entities to verify the identifying information, and/or (iv) other processes.

The identifying information may include (i) information regarding the channel card (e.g., a model number, a serial number, a card type, a manufacturer, a vendor), (ii) device measurements (e.g., processor speeds, storage capacity, data transmission speeds), (iii) a copy of the firmware code, (iv) any device certificates and/or device certificate chains stored by the channel card which are signed by private keys of authoritative entities (e.g., the manufacturer, the vendor), and/or (v) other information.

Obtaining the identifying information may include (i) providing a request for the identifying information to the channel card, (ii) receiving the identifying information from the channel card in response, (iii) reading the identifying information from storage (e.g., from local memory of the channel card), and/or (iv) other processes.

Performing the lookup in the trusted key database may include (i) identifying a private key used to sign a device certificate and/or at least a portion of a device certificate chain, (ii) searching the trusted key database to determine whether the private key is part of a trusted public private key pair (e.g., a public private key pair with authority to designate firmware as trustworthy for booting), (iii) using the corresponding public key in the trusted key database to cryptographically authenticate the private key, and/or (iv) other processes.

Communicating with the at least one remote entity may include (i) reading the identifying information obtained from the channel card to determine whether the channel card is associated with a trusted entity (e.g., a trusted manufacturer), (ii) establishing a connection with a remote system or device used by the trusted entity (e.g., a trusted manufacturer's system) via an out-of-band communication channel, (iii) providing at least a portion of the identifying information to the remote system or device for verification, (iv) receiving a response indicating whether the firmware is verified from the remote system or device, and/or (v) other processes.

Refer to the description of channel card verification process 204 for additional information and examples regarding verifying the firmware of the channel card.

After verifying the firmware, the management controller may obtain a channel card certificate usable to verify, at least in part, that the firmware is safe to boot. The channel card certificate may be signed using a private key of a public private key pair managed by an entity with authority to authorize firmware as being trustworthy to the data processing system. Obtaining the channel card certificate may include (i) generating the channel card certificate by the management controller, (ii) receiving the channel card certificate from another device (e.g., a trusted manufacturer), (iii) reading the channel card certificate from storage (e.g., storage used by a trusted manufacturer to store channel card certificates), and/or (iv) other processes.

Generating the channel card certificate by the management controller may include (i) obtaining a payload for the channel card certificate (e.g., a data structure indicating that the firmware of the channel card is safe to boot and/or that an entity is trusted to update firmware for the channel card), (iii) signing the channel card certificate using a private key of the management controller and/or any other private key which is part of a public private key pair in the trusted key database, and/or (iv) other processes.

At operation 304, at least one entry may be added by the management controller to a secure booting procedure database to facilitate verification of the firmware. The entry may include (i) a signed hash of the firmware, (ii) the channel card certificate, and/or (iii) other data to facilitate verification of the channel card firmware. Adding the at least one entry may include (i) obtaining a signed hash of the firmware, (ii) performing an updating process to include the signed hash and/or the channel card certificate in the secure booting procedure database, and/or (iii) other processes.

Obtaining the signed hash of the firmware may include (i) obtaining a hash of the firmware code (e.g., using methods similar to those described with respect to operation 300), (ii) signing the hash using an existing trusted key (e.g., the private key of the management controller and/or another private key of a public private key pair stored in the trusted key database), (iii) receiving the signed hash of the firmware from another entity (e.g., the signed hash of the firmware being signed using a second private key of a second public private key pair (e.g., a second public key of the second public private key pair being verified as trustworthy by the channel card certificate), and/or (iv) other processes.

In a first example, the management controller may obtain the channel card certificate indicating the firmware is safe to boot. The management controller may then obtain a hash of the firmware and sign it using the private key of the management controller to obtain a signed hash. The signed hash may then be added to the secure booting procedure database.

In a second example, the management controller may obtain a hash of the firmware (e.g., signed using a second private key of a second public private key pair) and the channel card certificate. The second public private key pair may be maintained, for example, by a manufacturer of the channel card. In the second example, the channel card certificate may include a second public key of the second public private key pair and may be signed by an existing trusted key (e.g., the private key of the management controller) to indicate that the manufacturer of the channel card is trusted to sign firmware updates (e.g., the signed hash). The channel card certificate and the signed hash may be added to the secure booting procedure database.

Performing the updating process may include (i) providing the entry to be added to the secure booting procedure database and/or instructions for adding the entry to the secure booting software, (ii) syncing the secure booting procedure database hosted by the management controller to the secure booting procedure database used by the secure booting software, and/or (iii) other processes.

At operation 306, after the at least one entry is added, the secure booting procedure may be resumed by the management controller. Resuming the secure booting procedure may include (i) providing a notification indicating booting of the channel card firmware is to be resumed and/or repeated to the secure booting software, (ii) storing the notification in a storage location which is automatically checked by the secure booting software, and/or (iii) other processes.

At operation 308, the secure booting procedure may be completed using at least the at least one entry to place the data processing system in an operable state that is conducive to providing computer-implemented services. Completing the secure booting procedure may include (i) obtaining, by secure booting software hosted by the data processing system, a hash of the firmware (e.g., using methods similar to those described with respect to operation 300), (ii) making a determination, using at least the hash of the firmware and the secure booting procedure database, regarding whether the firmware is verified (e.g., by performing a hash matching procedure using methods similar to those described with respect to operation 300), (iii) in a first instance of the determination in which the firmware is verified: booting the firmware as a part of the secure booting procedure (e.g., providing a notification indicating the firmware may boot to the channel card, storing the notification in a storage location which may be read by the firmware), (iv) in a second instance of the determination in which the firmware is not verified: continuing the secure booting procedure without booting the firmware (e.g., booting firmware hosted by other hardware components, ending the secure booting procedure, notifying a management entity that the firmware was not booted, generating a log based on the boot failure and storing the log in storage), and/or (v) other processes.

At operation 310, the computer-implemented services may be provided while the data processing system is in the operable state. The operable state may allow application software to be run by at least an operating system of the data processing system. Providing the computer-implemented services may include (i) handing off operation management of the data processing system from the secure booting software to the operating system or other type of operational management entity, (ii) loading application software and/or other software components which may be used to provide the computer-implemented services, (iii) using the software components, firmware, hardware components, and/or any combination thereof to provide the computer-implemented services using the data processing system, and/or (iv) other processes.

The method may end following operation 310.

Thus, as illustrated above, embodiments disclosed herein may provide systems and methods usable to manage operation of a data processing system using a management controller to facilitate a secure booting procedure for channel cards. The management controller may facilitate the secure booting procedure by dynamically updating a secure booting procedure database upon notification that a channel card has failed verification. By doing so, channel cards may be booted in a secure manner which may allow the channel cards to be used in providing computer-implemented services.

Figure 4:
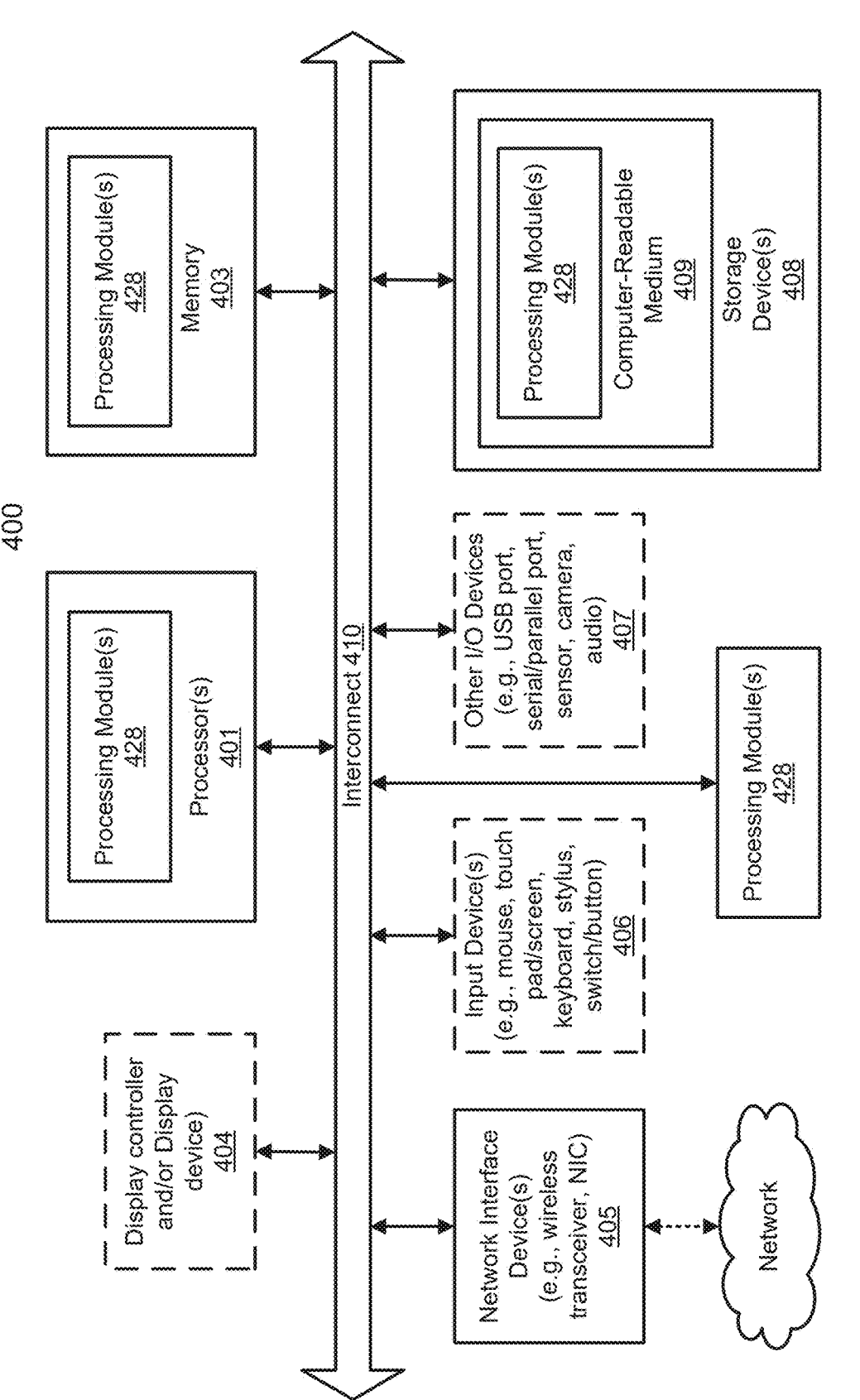
FIG. 4 shows a block diagram illustrating a data processing system in accordance with an embodiment.

Any of the components illustrated in FIGS. 1A-2C may be implemented with one or more computing devices. Turning to FIG. 4, a block diagram illustrating an example of a data processing system (e.g., a computing device) in accordance with an embodiment is shown. For example, system 400 may represent any of data processing systems described above performing any of the processes or methods described above. System 400 can include many different components. These components can be implemented as integrated circuits (ICs), portions thereof, discrete electronic devices, or other modules adapted to a circuit board such as a motherboard or add-in card of the computer system. Note also that system 400 is intended to show a high level view of many components of the computer system. However, it is to be understood that additional components may be present in certain implementations and furthermore, different arrangement of the components shown may occur in other implementations. System 400 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 400 includes processor 401, memory 403, and devices 405-407 via a bus or an interconnect 410. Processor 401 may represent a single processor or multiple processors with a single processor core or multiple processor cores included therein. Processor 401 may represent one or more general-purpose processors such as a microprocessor, a central processing unit (CPU), or the like. More particularly, processor 401 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 401 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 401 may communicate with memory 403, which in one embodiment can be implemented via multiple memory devices to provide for a given amount of system memory. Memory 403 may include one or more volatile storage (or memory) devices such as random access memory (RAM), dynamic RAM (DRAM), synchronous DRAM (SDRAM), static RAM (SRAM), or other types of storage devices. Memory 403 may store information including sequences of instructions that are executed by processor 401, or any other device. For example, executable code and/or data of a variety of operating systems, device drivers, firmware (e.g., input output basic system or BIOS), and/or applications can be loaded in memory 403 and executed by processor 401. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 400 may further include IO devices such as devices (e.g., 405, 406, 407, 408) including network interface device(s) 405, optional input device(s) 406, and other optional IO device(s) 407. Network interface device(s) 405 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 406 may include a mouse, a touch pad, a touch sensitive screen (which may be integrated with a display device of optional graphics subsystem 404), a pointer device such as a stylus, and/or a keyboard (e.g., physical keyboard or a virtual keyboard displayed as part of a touch sensitive screen). For example, input device(s) 406 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 407 may include an audio device. An audio device may include a speaker and/or a microphone to facilitate voice-enabled functions, such as voice recognition, voice replication, digital recording, and/or telephony functions. Other IO devices 407 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. IO device(s) 407 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 410 via a sensor hub (not shown), while other devices such as a keyboard or thermal sensor may be controlled by an embedded controller (not shown), dependent upon the specific configuration or design of system 400.

To provide for persistent storage of information such as data, applications, one or more operating systems and so forth, a mass storage (not shown) may also couple to processor 401. In various embodiments, to enable a thinner and lighter system design as well as to improve system responsiveness, this mass storage may be implemented via a solid state device (SSD). However, in other embodiments, the mass storage may primarily be implemented using a hard disk drive (HDD) with a smaller amount of SSD storage to act as an SSD cache to enable non-volatile storage of context state and other such information during power down events so that a fast power up can occur on re-initiation of system activities. Also a flash device may be coupled to processor 401, e.g., via a serial peripheral interface (SPI). This flash device may provide for non-volatile storage of system software, including a basic input/output software (BIOS) as well as other firmware of the system.

Storage device 408 may include computer-readable storage medium 409 (also known as a machine-readable storage medium or a computer-readable medium) on which is stored one or more sets of instructions or software (e.g., processing module, unit, and/or processing module/unit/logic 428) embodying any one or more of the methodologies or functions described herein. Processing module/unit/logic 428 may represent any of the components described above. Processing module/unit/logic 428 may also reside, completely or at least partially, within memory 403 and/or within processor 401 during execution thereof by system 400, memory 403 and processor 401 also constituting machine-accessible storage media. Processing module/unit/logic 428 may further be transmitted or received over a network via network interface device(s) 405.

Computer-readable storage medium 409 may also be used to store some software functionalities described above persistently. While computer-readable storage medium 409 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of embodiments disclosed herein. The term "computer-readable storage medium" shall accordingly be taken to include, but not be limited to, solid-state memories, and optical and magnetic media, or any other non-transitory machine-readable medium.

Processing module/unit/logic 428, components and other features described herein can be implemented as discrete hardware components or integrated in the functionality of hardware components such as ASICS, FPGAs, DSPs or similar devices. In addition, processing module/unit/logic 428 can be implemented as firmware or functional circuitry within hardware devices. Further, processing module/unit/logic 428 can be implemented in any combination hardware devices and software components.

Note that while system 400 is illustrated with various components of a data processing system, it is not intended to represent any particular architecture or manner of interconnecting the components; as such details are not germane to embodiments disclosed herein. It will also be appreciated that network computers, handheld computers, mobile phones, servers, and/or other data processing systems which have fewer components or perhaps more components may also be used with embodiments disclosed herein.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments disclosed herein also relate to an apparatus for performing the operations herein. Such a computer program is stored in a non-transitory computer readable medium. A non-transitory machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g., circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments disclosed herein are not described with reference to any particular programming language. It will be appreciated that a variety of programming languages may be used to implement the teachings of embodiments disclosed herein.

In the foregoing specification, embodiments have been described with reference to specific exemplary embodiments thereof. It will be evident that various modifications may be made thereto without departing from the broader spirit and scope of the embodiments disclosed herein as set forth in the following claims. The specification and drawings are, accordingly, to be regarded in an illustrative sense rather than a restrictive sense.

What is claimed is:

1. A method for managing operation of a data processing system, the method comprising:
   identifying that firmware hosted by a channel card operably connected to the data processing system has failed verification during a secure booting procedure;
   performing, by a management controller of the data processing system, a verification procedure to obtain a channel card certificate;
   adding, by the management controller, at least one entry to a secure booting procedure database to facilitate verification of the firmware;
   after the at least one entry is added, resuming, by the management controller, the secure booting procedure;
   completing, using at least the at least one entry, the secure booting procedure to place the data processing system in an operable state that is conducive to providing computer-implemented services; and
   providing, while the data processing system is in the operable state, the computer-implemented services.

2. The method of claim 1, wherein the management controller is separate from and tasked with managing operation of hardware resources of the data processing system, the hardware resources comprising at least the channel card.

3. The method of claim 1, wherein performing the verification procedure comprises obtaining identifying information for the firmware:
   via sideband channels of the data processing system, and
   without the identifying information traversing an operating system of the data processing system.

4. The method of claim 1, wherein the channel card certificate:

is signed using a private key of a public private key pair managed by an entity with authority to authorize firmware as being trustworthy to the data processing system, and is usable to verify, at least in part, that the firmware is safe to boot.

5. The method of claim 4, wherein the at least one entry comprises:

a signed hash of the firmware, the signed hash being verifiable by the data processing system using an existing trusted key.

6. The method of claim 4, wherein the at least one entry comprises:

a signed hash of the firmware, the signed hash of the firmware being signed using a second private key of a second public private key pair; and the channel card certificate, the channel card certificate indicating that the second public private key pair is trustworthy.

7. The method of claim 1, wherein completing the secure booting procedure comprises:

obtaining, by secure booting software hosted by the data processing system, a hash of the firmware;

making a determination, using at least the hash of the firmware and the secure booting procedure database, regarding whether the firmware is verified;

in a first instance of the determination in which the firmware is verified:

booting the firmware as a part of the secure booting procedure; and in a second instance of the determination in which the firmware is not verified:

continuing the secure booting procedure without booting the firmware.

8. The method of claim 1, wherein the operable state allows application software to be run by at least an operating system of the data processing system.

9. A non-transitory machine-readable medium having instructions stored therein, which when executed by a processor, cause the processor to perform operations for managing operation of a data processing system, the operations comprising:

identifying that firmware hosted by a channel card operably connected to the data processing system has failed verification during a secure booting procedure;

performing, by a management controller of the data processing system, a verification procedure to obtain a channel card certificate;

adding, by the management controller, at least one entry to a secure booting procedure database to facilitate verification of the firmware;

after the at least one entry is added, resuming, by the management controller, the secure booting procedure;

completing, using at least the at least one entry, the secure booting procedure to place the data processing system in an operable state that is conducive to providing computer-implemented services; and providing, while the data processing system is in the operable state, the computer-implemented services.

10. The non-transitory machine-readable medium of claim 9, wherein the management controller is separate from and tasked with managing operation of hardware resources of the data processing system, the hardware resources comprising at least the channel card.

11. The non-transitory machine-readable medium of claim 9, wherein performing the verification procedure comprises obtaining identifying information for the firmware:

via sideband channels of the data processing system, and without the identifying information traversing an operating system of the data processing system.

12. The non-transitory machine-readable medium of claim 9, wherein the channel card certificate:

is signed using a private key of a public private key pair managed by an entity with authority to authorize firmware as being trustworthy to the data processing system, and is usable to verify, at least in part, that the firmware is safe to boot.

13. The non-transitory machine-readable medium of claim 12, wherein the at least one entry comprises:

a signed hash of the firmware, the signed hash being verifiable by the data processing system using an existing trusted key.

14. The non-transitory machine-readable medium of claim 12, wherein the at least one entry comprises:

a signed hash of the firmware, the signed hash of the firmware being signed using a second private key of a second public private key pair; and the channel card certificate, the channel card certificate indicating that the second public private key pair is trustworthy.

15. A data processing system, comprising:

a processor; and a memory coupled to the processor to store instructions, which when executed by the processor, cause the processor to perform operations for managing operation of a data processing system, the operations comprising:

identifying that firmware hosted by a channel card operably connected to the data processing system has failed verification during a secure booting procedure;

performing, by a management controller of the data processing system, a verification procedure to obtain a channel card certificate;

adding, by the management controller, at least one entry to a secure booting procedure database to facilitate verification of the firmware;

after the at least one entry is added, resuming, by the management controller, the secure booting procedure;

completing, using at least the at least one entry, the secure booting procedure to place the data processing system in an operable state that is conducive to providing computer-implemented services; and providing, while the data processing system is in the operable state, the computer-implemented services.

16. The data processing system of claim 15, wherein the management controller is separate from and tasked with managing operation of hardware resources of the data processing system, the hardware resources comprising at least the channel card.

17. The data processing system of claim 15, wherein performing the verification procedure comprises obtaining identifying information for the firmware:

via sideband channels of the data processing system, and without the identifying information traversing an operating system of the data processing system.

18. The data processing system of claim 15, wherein the channel card certificate:

is signed using a private key of a public private key pair managed by an entity with authority to authorize firmware as being trustworthy to the data processing system, and is usable to verify, at least in part, that the firmware is safe to boot.

19. The data processing system of claim 18, wherein the at least one entry comprises:

a signed hash of the firmware, the signed hash being verifiable by the data processing system using an existing trusted key.

20. The data processing system of claim 18, wherein the at least one entry comprises:

a signed hash of the firmware, the signed hash of the firmware being signed using a second private key of a second public private key pair; and the channel card certificate, the channel card certificate indicating that the second public private key pair is trustworthy.

* * * * *